May 3, 1966  G. KRAUS  3,248,774
CONTAINER BODY TRIMMING AND/OR DEBURRING APPARATUS
Filed June 27, 1963  2 Sheets-Sheet 1
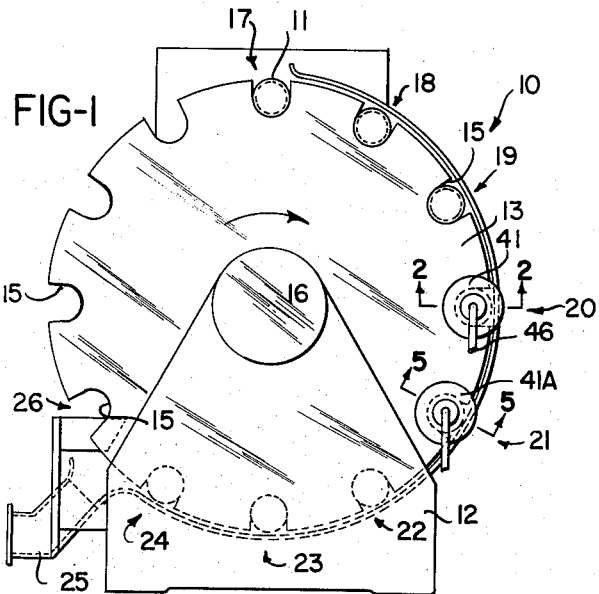
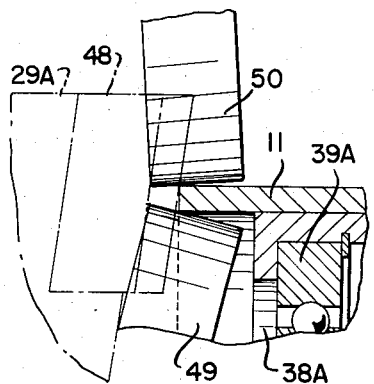
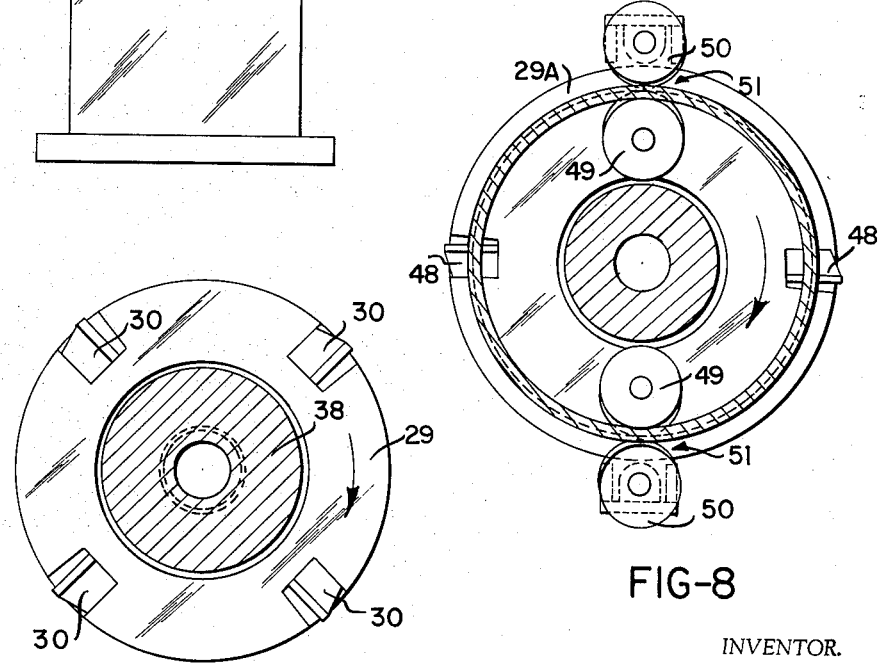
INVENTOR.
GUIDO KRAUS
BY Glenn, Palmer & Matthews
HIS ATTORNEYS May 3, 1966  G. KRAUS  3,248,774
CONTAINER BODY TRIMMING AND/OR DEBURRING APPARATUS
Filed June 27, 1963  2 Sheets-Sheet 2
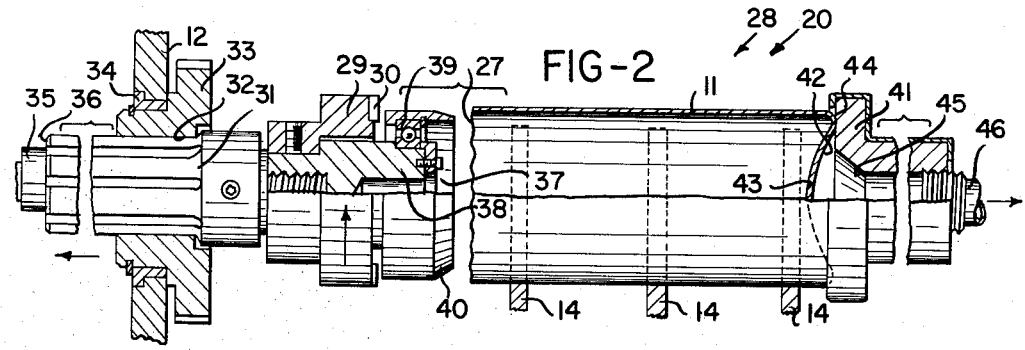
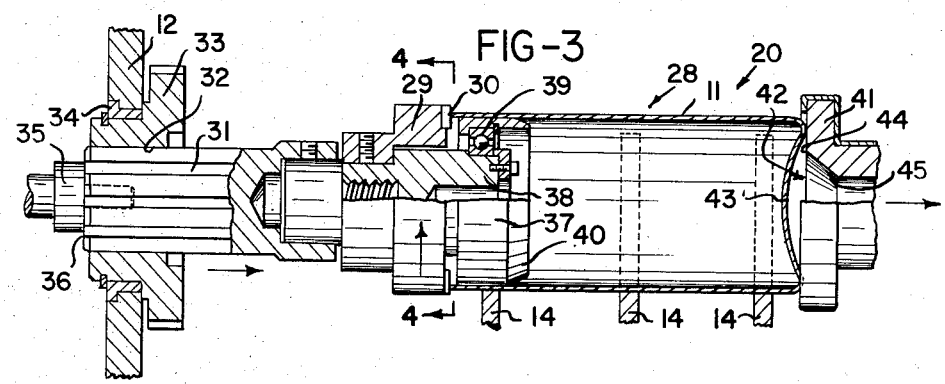
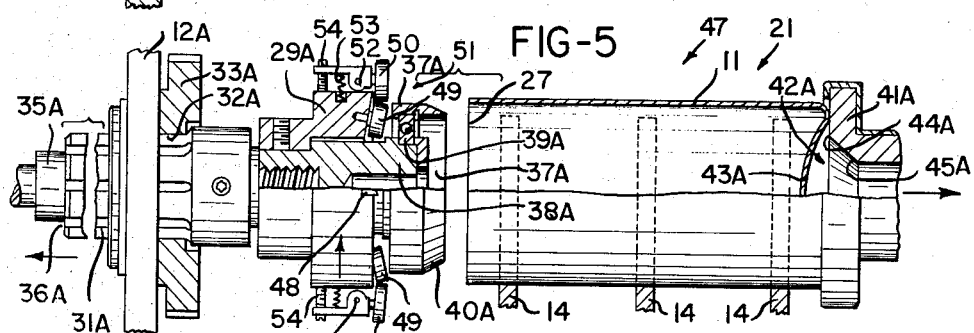
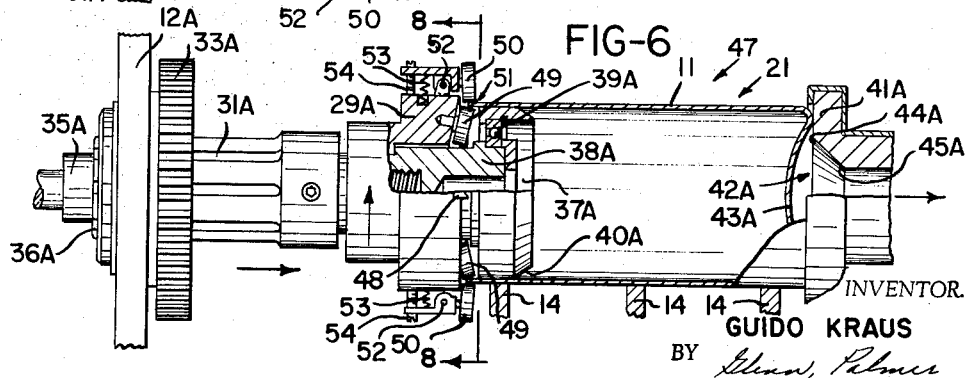
INVENTOR.
GUIDO KRAUS
BY
HIS ATTORNEYS

United States Patent Office 3,248,774
Patented May 3, 1966

3,248,774
CONTAINER BODY TRIMMING AND/OR DEBURRING APPARATUS
Guido Kraus, Chesterfield County, Va., assignor to Reynolds Metals Company, Richmond, Va., a corporation of Delaware
Filed June 27, 1963, Ser. No. 291,032
17 Claims. (Cl. 29—38)

This invention relates to an improved apparatus for serially and continuously performing one or more forming operations on the opened end of container bodies as the container bodies are passed through the apparatus of this invention to prepare the container bodies for subsequent use thereof.

It is well known that metallic container bodies or the like can be formed by extruding or elongating previously formed, shallow cup-shaped bodies so that the resulting container body has an open end and an opposed closed end.

However, it has been found that during such elongation operation, not only is the open end of the container body rough and non-uniform, but also the container body has a non-uniform height relative to other similarly produced container bodies.

Therefore, it is necessary to trim the open ends of such container bodies to not only remove the rough edges thereof, but to also form the container bodies with substantially uniform heights.

In the past, such trimming operation was performed by shear type cutting or other means wherein this prior known cutting or trimming means provides numerous problems in the setup of the cutting apparatus as well as in the maintenance thereof. In regard to the maintenance problem of the prior known cutting means, the biggest problem is the removal of the trim material because the same is relatively large and cannot be automatically carried away.

According to the teachings of this invention, however, an improved apparatus is provided wherein the trimming operation can take place at a high speed and will produce only small chips or trimmed particles which can be easily removed by vacuum or other means since the trimmed scrap is in small particles and no problem will exist from the standpoint of handling of the scrap through the scrap conveying system.

In particular, the trimming means of this invention utilizes high speed milling type of cutting knives that give a very good clean edge to the trimmed container body and also permit the container body heights to be more tightly controlled.

In addition, this invention provides an improved deburring apparatus which will smooth out the trimmed edges of the container body and give a conditional edge to the open end thereof to facilitate subsequent necking down of the container body so that a smaller top or container end can be utilized to close the open end of the container body. In addition, the deburring of the open ends of the container bodies will reduce the number of cracked ends thereof due to subsequent flanging operations produced on the open ends of the trimmed container bodies.

If desired, the deburring features of this invention can be utilized as a separate apparatus or in combination with the trimming features of this invention.

In particular, one embodiment of this invention includes a rough trimming apparatus and a fine trimming apparatus the fine trimming apparatus also including the deburring features of this invention. However, it is to be understood that the deburring features of this invention could be utilized in a separate apparatus from the trimming features of this invention, if desired.

Accordingly, it is an object of this invention to provide an improved trimming apparatus having one or more of the novel features of this invention as set forth above or hereinafter shown or described.

Another object of this invention is to provide an improved trimming method having one or more of the novel features of this invention as set forth above or hereinafter shown or described.

A further object of this invention is to provide an improved deburring apparatus having one or more of the novel features of this invention as set forth above or hereinafter shown or described.

Another object of this invention is to provide an improved deburring method having one or more of the novel features of this invention as set forth above or hereinafter shown or described.

A further object of this invention is to provide an improved, simultaneous trimming and deburring apparatus having one or more of the novel features of this invention as set forth above or hereinafter shown or described.

Another object of this invention is to provide an improved, simultaneous deburring and trimming method having one or more of the novel features of this invention as set forth above or hereinafter shown or described.

Other objects, uses and advantages of this invention are apparent from a reading of this description, which proceeds with reference to the accompanying drawings forming a part thereof and wherein:

FIGURE 1 is a schematic end view of an apparatus utilizing the features of this invention.

FIGURE 2 is an enlarged, fragmentary, partial cross-sectional view taken on line 2—2 of FIGURE 1.

FIGURE 3 is a view similar to FIGURE 2 and illustrates the trimming apparatus of this invention in one of its operating positions.

FIGURE 4 is an enlarged, cross-sectional view taken on line 4—4 of FIGURE 3.

FIGURE 5 is an enlarged, fragmentary, partial cross-sectional view taken on line 5—5 of FIGURE 1.

FIGURE 6 is a view similar to FIGURE 5 and illustrates the apparatus of FIGURE 5 in another operating position thereof.

FIGURE 7 is a schematic, fragmentary view illustrating how the various parts of the apparatus of FIGURE 5 operate on the open end of the container body or the like.

FIGURE 8 is an enlarged, cross-sectional view taken on line 8—8 of FIGURE 6.

While the various features of this invention are hereinafter described as being particularly adaptable for trimming and/or deburring an open end of a container body or the like, it is to be understood that the various features of this invention can be utilized singly or in any combination thereof to provide means for trimming and/or deburring other articles as desired.

Therefore, this invention is not to be limited to only the embodiments illustrated in the drawings, because the drawings are merely utilized to illustrate one of the wide variety of uses of this invention.

Refering now to FIGURE 1, a typical apparatus is generally indicated by the reference numeral 10 and is utilized to convey formed container bodies 11, FIGURE 2, in a desired sequence to various operating apparatus, including the apparatus of this invention.

In particular, the apparatus 10 comprises a frame means 12 rotably carrying a star wheel 13 which includes a plurality of spaced plates 14, FIGURE 2, respectively having container body receiving notches 15 formed in the outer periphery thereof, the star wheel 13 being adapted to be indexed in a clockwise direction about an axis of rotation 16 in the manner illustrated in FIGURE 1.

For example, the star wheel 13 can sequentially receive a formed container body 11 at the station 17 thereof and subsequently index that particular container body 11 through stations 18, 19, 20, 21, 22, 23 and 24 whereby one or more operations can be formed on the particular container body 11 while it is momentarily held at a particular station, the star wheel 13 being adapted to dispense the particular container body 11 to a hopper means 25 as the star wheel 13 advances between stations 24 and 26 in the manner illustrated in FIGURE 1.

In particular, each container body 11 can have the open end 27, FIGURE 2, thereof trimmed by the apparatus of this invention while at station 20 and can have the trimmed end thereof deburred while at station 21.

Such trimming and deburring operations of this invention will now be described.

As illustrated in FIGURES 2 and 3, the rough trimming apparatus and method of this invention is generally indicated by the reference numeral 28 and comprises a rotatable and axially movable head 29 carrying one or more milling knives 30 in the manner illustrated in FIGURES 2 and 4 to mill trim the open end 27 of the container body 11 in a manner hereinafter described.

While the head 29 can be rotated and axially moved in any suitable manner, one embodiment thereof is illustrated in FIGURES 2 and 3 and comprises a splined shaft 31 operatively connected to the head 29 and received in a splined bore 32 of a drive gear 33 rotatably mounted to the frame means 12 by suitable bearing means 34. In this manner, rotation of the drive gear 33 by any suitable power source causes like rotation of the head 29 about the axis of rotation of the splined shaft 31.

In order to cause axial movement of the rotating head 29, a suitable ram 35 is operatively interconnected to the end 36 of the splined shaft 31 and is adapted to be cam operated, hydraulically operated, or axially moved by other actuators to cause axial movement of the splined shaft 31 in the splined bore 32 of the drive gear 33 whereby the rotating head 29 will be likewise axially moved to the right or to the left as desired.

A container body centering member 37 is rotatably carried on an extension 38 of the head 29 by suitable bearing means 39, the centering member 37 having a beveled leading surface 40 to facilitate insertion thereof in the open end 27 of the container body 11 in a manner hereinafter described.

A support member 41 is disposed spaced from the head 29 and is suitably carried by the frame means 12 of the apparatus 10, the support member 41 having a pocket-defining portion 42 for receiving the closed end 43 of the container body 11 in the manner illustrated in FIGURE 3. The pocket-defining surface 44 of the support member 41 is interrupted by a suitable passage means 45 adapted to be interconnected to a vacuum source by a conduit means 46 whereby when a vacuum is imposed in the passage means 45 of the support member 41, the vacuum tends to tightly hold the closed end 43 of the container body 11 against the surface 44 of support member 41 to not only positively position the container body 11 relative to the head 29 of the apparatus 28, but to also prevent rotational movement of the container body 11 relative to the head 29 because of the frictional engagement between the closed end 43 of the container body 11 and the surface 44 of the support member 41.

The operation of the trimming apparatus and method 28 of this invention will now be described.

As illustrated in FIGURE 2, the star wheel 13 of the apparatus 10 of FIGURE 1 indexes an elongated container body 11 between the head 29 and support member 41 in the manner illustrated in FIGURE 2 whereby the star wheel 13 remains stationary until after the apparatus 28 of this invention has performed its trimming operation.

In particular, after the container body 11 has been moved to the position illustrated in FIGURE 2, the rotating head 29 is axially moved to the right by the ram 35 whereby the centering member 37 of the head 29 is received in the open end 27 of the container body 11 to align the container body 11 relative to the milling knives 30 of the head 29.

As the head 29 axially moves to the right, the same compacts the closed end 43 of the container body 11 against the surface 44 of the support member 41 whereby the vacuum interconnected to the passage means 45 tightly holds the container body 11 against the surface 44 to prevent rotational movement thereof.

Further axial movement of the head 29 to the right by the ram 35 causes the orbiting milling knives 30 to chip away the irregularities of the open end 27 of the container body 11 in the manner illustrated in FIGURE 3 until the milling knives 30 have been axially advanced to the right to a desired degree to give the container body 11 the desired height. Because the milling knives 30 are orbited by the rotating head 29 at the rate of approximately 1,250 to 1,500 r.p.m., it can been seen that the same remove relatively small particles from the end 27 of the container body 11 whereby the removed particles can be readily removed from the apparatus 28 by suitable vacuum means and present no problem in the trimming operation as results when the prior known shear trimming methods are utilized.

Further, because the throw of the ram 35 can be selectively adjusted while the apparatus 28 is operating, the apparatus 28 can have its trimming operation changed to vary the can heights or for adjustment purposes without disassembling the apparatus 28 as required when making a change in the prior known shear trimming apparatus.

Therefore, it can be seen that not only are maintenance problems of the apparatus 28 of this invention held at a minimum, but also, a more uniform can height can be maintained and a cleaner cut can be provided for the open end 27 thereof.

After the rotating head 29 has been axially moved to the right a desired distance to provide the desired height of the container body 11, the ram 35 is moved back to the left to carry the head 29 therewith whereby the communication between the vacuum source and the passage means 45 of the support member 41 can be terminated so that when the head 29 has been moved to the left to clear the centering member 37 from the container body 11, the star wheel 13 can again be indexed in a clockwise direction in FIGURE 1 to move the trimmed body 11 to the station 21 while moving a new container body to the apparatus 28 to be trimmed in the above manner.

Therefore, it can be seen that this invention provides an improved apparatus and method for trimming an open end of a container body or the like.

Should it be found that the trimming operation produced by the apparatus 28 of this invention in the above manner does not give as clean an edge to the open end 27 of the container body 11 as desired, the apparatus of this invention disposed at the station 21 of the apparatus 10 of FIGURE 1 can be utilized to provide a fine trimming of the open end 27 of the container body 11.

In addition, the apparatus disposed at the station 21 of FIGURE 1 can also be utilized to deburr the trimmed edge of the container body 11.

However, it is to be understood that the fine trimming and deburring operation of this invention could be performed at separate stations of the apparatus 10 by completely separate apparatus rather than by a single apparatus as now to be described.

In particular, reference is made to FIGURES 5 and 6 wherein the simultaneous trimming and deburring apparatus of this invention is generally indicated by the reference numeral 47, the apparatus 47 of FIGURES 5 and 6 having the parts thereof similar to the apparatus 28 previously described designated by like reference numerals followed by the reference letter "A."

For example, the apparatus 47 of this invention includes a head 29A that is adapted to be rotated and axially advanced in the same manner as the head 29 previously described, the head 29A carrying a container body centering member 37A in the same manner as the centering member 37 of the apparatus 28.

In addition, the apparatus 47 of this invention includes a support member 41A formed in substantially the same manner as the support member 41 of the apparatus 28 whereby the particular like details of the head 29A and support member 41A of the apparatus 47 will not be described as such details have already been described in connection with the apparatus 28.

As illustrated in FIGURES 5 and 8, the head 29A of the apparatus 47 carries one or more milling knives 48 having the cutting edge thereof disposed at an angle relative to the open end 27 of the container body 11 as illustrated by dotted lines in FIGURE 7.

In addition, the head 29A of the apparatus 47 of this invention carries one or more pairs of deburring rollers 49 and 50 rotatably carried by the head 29A on axes of rotation spaced from the axis of rotation of the head 29A whereby the rollers 49 and 50 can rotate independently of the head 29A while the rollers 49 and 50 are being orbited by the head 29A for a purpose hereinafter described. Each pair of rollers 49 and 50 cooperate together to define a nip 51 therebetween to receive the open end 27 of the container body 11 in the manner illustrated by full lines in FIGURE 7 to deburr the trimmed edge 27 in a manner hereinafter described.

While the roller 49 of each pair of rollers 49 and 50 of the apparatus 47 is fixed from other than rotational movement relative to the head 29A, the upper roller 50 is pivotally mounted by a pivot pin 52 carried by the head 29A whereby spring means 53 tends to urge the roller 50 into contact with the roller 49.

However, pivotal movement of the roller 50 away from the roller 49 is limited by an adjustable stop screw 54 or other suitable means for a purpose hereinafter described.

The operation of the apparatus 47 of this invention will now be described.

As illustrated in FIGURE 5, the star wheel 13 has indexed a container body 11 between the rotating head 29A and the support member 41A whereby the rotating head 29A is axially moved to the right by the ram means 35A to cause the centering member 37A of the head 29A to be telescopically received in the open end 27 of the container body 11 to align the container body 11 relative to the rollers 49 and 50 and milling knives 48.

Further axial movement of the head 29A to the right causes the closed end 43 of the container body 11 to be compacted against the support member 41A to be held thereagainst from rotational movement by the previously described vacuum means.

Subsequently, further movement of the head 29A to the right causes the milling knives 48 to trim the open end 27 of the container body 11 in substantially the same manner as the milling knives 30 previously described.

However, simultaneously with the trimming provided by the milling knives 48, the open end 27 of the container body 11 is received between the opposed rollers 49 and 50 in the manner illustrated in FIGURES 6 and 8 whereby the rollers 49 and 50 act to deburr and condition the open end 27 of the container body 11 through the angular relation of the deburring surfaces of the rollers 49 and 50 relative to the edges of the open end 27 of the container body 11 in the manner illustrated by full lines in FIGURE 7.

Therefore, it can be seen that by controlling the axial movement of the head 29A to the right by the ram 35A, the height of the container 11 can be closely controlled and the resulting trimmed end 27 of the container body 11 is relatively smooth and conditioned in such a manner that the same will not tend to crack when the same is subsequently flanged by other apparatus to produce means for fastening an end cover over the open end 27 of the container body 11.

Further, since the head 29A can be rotated at speeds of approximately 2,000 r.p.m., it can be seen that the trimmed particles produced by the orbiting knives 48 are relatively small to be readily removed from the apparatus in the manner previously described.

Therefore, it can be seen that the apparatus 47 of this invention provides an improved means for providing a fine trimming of the end 27 of the container body 11 while simultaneously deburring the open end 27 of the container body 11.

After the head 29A has performed the trimming and deburring operation in the above manner, the head 29A is axially moved back to the left by the ram 35A whereby the container body 11 can be indexed from the station 21 of the apparatus 10 in FIGURE 1 to the station 22 in the manner previously described by the star wheel 13 while a new container 11 is indexed between the head 29A and support member 41A to be trimmed and deburred in the above manner.

While the apparatus 47 of this invention has been described as providing a simultaneous trimming and deburring operation, it is to be understood that the milling knives 48 can be eliminated from the head 29A whereby the apparatus 47 of this invention would merely perform a deburring operation. Conversely, the deburring rolls 49 and 50 could be eliminated from the head 29A of the apparatus 47 whereby the resulting apparatus 47 would merely provide a trimming operation.

Further, while the support members 41 and 41A of the apparatus 28 and 47 of this invention have been heretofore illustrated and described as being stationary, it is to be understood that the same can be axially movable in the same manner as the heads 29 and 29A to not cause axial movement between the container body 11 and the heads 29 and 29A whereby the heads 29 and 29A could be formed so that the same are not axially movable, but also the axially movable support members 41 and 41A could be utilized in combination with the axially movable heads 29 and 29A to properly position the container bodies 11 therebetween as desired.

Thus, it can be seen that this invention provides an improved trimming apparatus, an improved deburring apparatus and method and an improved simultaneous trimming and deburring method and apparatus.

While the form of the invention now preferred has been disclosed as required by the statutes, other forms may be used, all coming within the scope of the claims which follow.

What is claimed is:

1. Apparatus for trimming an open end of a container body or the like comprising a container body carrying member, means for serially feeding container bodies to said member at a first station, means for serially removing said container bodies from said member at a third station, means for indexing said member to serially move each container body through an orbital path and position the same at a second station between said first and third station, a milling knife, means for orbiting said knife about a path concentric with the longitudinal axis of each container body positioned at said second station by said indexing member, and means for causing relative movement between said positioned container body and knife to cause said knife to trim said open end of said positioned container body whereby after said container body has been trimmed at said second station said indexing member will index said trimmed body away from said first station toward said third station and will index another container body received at said first station to said second station.

2. Apparatus as set forth in claim 1 wherein deburring means are provided for deburring said trimmed open end of said container body.

3. Apparatus for deburring an open end of a container body or the like comprising a container body carrying member, means for serially feeding container bodies to said member at a first station, means for serially removing said container bodies from said member at a third station, means for indexing said member to serially move each container body through an orbital path and position the same at a second station between said first and third station, a pair of cooperating deburring rollers defining a nip therebetween, said rollers respectively having deburring surfaces, means for orbiting said rollers about a path concentric with the longitudinal axis of each container body positioned at said second station by said indexing member, said means permitting said rollers to rotate about axes of rotation while said rollers are orbiting, and means for causing relative movement between said positioned container body and said rollers to cause said open end of said positioned container body to be received in said nip of said rollers and be deburred thereby whereby after said container body has been deburred at said second station said indexing member will index said deburred body away from said first station toward said third station and will index another container body received at said first station to said second station.

4. Apparatus as set forth in claim 3 wherein trimming means are provided for trimming the open end of said container body.

5. Apparatus for trimming and deburring an open end of a container body or the like comprising a container body carrying member, means for serially feeding container bodies to said member at a first station, means for serially removing said container bodies from said member at a third station, means for indexing said member to serially move each container body through an orbital path and position the same at a second station between said first and third station, a milling knife, a pair of cooperating deburring rollers defining a nip therebetween, said rollers respectively having deburring surfaces, means for orbiting said knife and said rollers about a path concentric with the longitudinal axis of each container body positioned at said second station by said indexing member, and means for causing relative movement between said positioned container body and said orbiting means to cause said knife to trim said open end of said positioned container body and to cause said open end of said positioned container body to be received in said nip of said rollers and be deburred thereby whereby after said container body has been trimmed and deburred at said second station said indexing member will index said trimmed and deburred body away from said first station toward said third station and will index another container body received at said first station to said second station.

6. Apparatus for trimming an open end of a container body or the like comprising a container body carrying member, means for serially feeding container bodies to said member at a first station, means for serially removing said container bodies from said member at a said station, means for indexing said member to serially move each container body through an orbital path and position the same at a second station between said first and third station, a head carrying at least one milling knife having its cutting axis disposed spaced from the longitudinal axis of each container body positioned at said second station by said indexing member, means for rotating one of said head and said positioned container body, and means for causing relative movement between said positioned container body and said head to cause said knife to trim said open end of said positioned container body whereby after said container body has been trimmed at said second station said indexing member will index said trimmed body away from said first station toward said third station and will index another container body received at said first station to said second station.

7. Apparatus for deburring an open end of a container body comprising a container body carrying member, means for serially feeding container bodies to said member at a first station, means for serially removing said container bodies from said member at a third station, means for indexing said member to serially move each container body through an orbital path and position the same at a second station between said first and third station, a head carrying at least one pair of cooperating rollers defining a nip therebetween and being rotatable relative to said head about axes of rotation disposed space from the longitudinal axis of each container body positioned at said second station by said indexing member, said rollers respectively having deburring surfaces, means for rotating one of said head and said positioned container body, and means for causing relative movement between said positioned container body and said head to cause said open end of said positioned container body to be received in said nip of said rollers and be deburred thereby whereby after said container body has been deburred at said second station said indexing member will index said deburred body away from said first station toward said third station and will index another container body received at said first station to said second station.

8. Apparatus for trimming and deburring an open end of a container body or the like comprising a container body carrying member, means for serially feeding container bodies to said member at a first station, means for serially removing said container bodies from said member at a third station, means for indexing said member to serially move each container body through an orbital path and position the same at a second station between said first and third station, a head carrying at least one milling knife having its cutting axis disposed spaced from the longitudinal axis of each container body positioned at said second station by said indexing member, said head carrying at least one pair of cooperating rollers defining a nip therebetween and being rotatable relative to said head about axes of rotation disposed spaced from the longitudinal axis of said positioned container body, said rollers respectively having deburring surfaces, means for rotating one of said head and said positioned container body, means for causing relative movement between said positioned container body and said head to cause said knife to trim said open end of said positioned container body and to cause said open end of said positioned container body to be received in said nip of said rollers and be deburred thereby whereby after said container body has been trimmed and deburred at said second station said indexing member will index said trimmed and deburred body away from said first station toward said third station and will index another container body received at said first station to said second station.

9. Apparatus for trimming an open end of a container body or the like comprising a container body carrying member, means for serially feeding container bodies to said member at a first station, means for serially removing said container bodies from said member at a third station, means for indexing said member to serially move each container body through an orbital path and position the same at a second station between said first and third station, a rotatable head carrying at least one milling knife having a cutting axis disposed spaced from the axis of rotation of said head, said head rotatably carrying a container body centering member, means for rotating said head, and means for causing relative movement between said head and each container body positioned at said second station by said indexing member to cause said centering member to be received in said open end of said positioned container body to align said positioned container body relative to said knife and to cause said knife to trim said open end of said positioned container body whereby after said container body has been trimmed at said second station said indexing member will index said trimmed body away from said first station toward said third station and will index another container body received at said first station to said second station.

10. Apparatus for deburring an open end of a container body or the like comprising a container body carrying member, means for serially feeding container bodies to said member at a first station, means for serially removing said container bodies from said member at a third station, means for indexing said member to serially move each container body through an orbital path and position the same at a second station between said first and third station, a rotatable head carrying at least one pair of cooperating rollers defining a nip therebetween and having axes of rotation disposed spaced from the axis of rotation of said head, said rollers respectively having deburring surfaces, said head rotatably carrying a container body centering member, means for rotating said head, and means for causing relative movement between said head and each container body positioned at said second station by said indexing member to cause said centering member to be received in said open end of said positioned container body to align said positioned container body relative to said rollers and to cause said open end of said positioned container body to be received in said nip of said rollers to be deburred thereby whereby after said container body has been deburred at said second station said indexing member will index said deburred body away from said first station toward said third station and will index another container body received at said first station to said second station.

11. Apparatus for trimming and deburring an open end of a container body or the like comprising a container body carrying member, means for serially feeding container bodies to said member at a first station, means for serially removing said container bodies from said member at a third station, means for indexing said member to serially move each container body through an orbital path and position the same at a second station between said first and third station, a rotatable head carrying at least one milling knife having a cutting axis disposed spaced from the axis of rotation of said head, said head carrying at least one pair of cooperating rollers defining a nip therebetween and having axes of rotation disposed spaced from said axis of rotating of said head, said rollers respectively having deburring surfaces, said head rotatably carrying a container body centering member, means for rotating said head, and means for causing relative movement between said head and each container body positioned at said second station by said indexing member to cause said centering member to be received in said open end of said positioned container body to align said positioned container body relative to said knife and said rollers, to cause said knife to trim the open end of said positioned container body and to cause the open end of said positioned container body to be received in said nip of said rollers to be deburred thereby whereby after said container body has been trimmed and deburred at said second station said indexing member will index said trimmed and deburred body away from said first station toward said third station and will index another container body received at said first station to said second station.

12. Apparatus for trimming an open end of a container body or the like comprising a container body carrying member, means for serially feeding container bodies to said member at a first station, means for serially removing said container bodies from said member at a third station, means for indexing said member to serially move each container body through an orbital path and position the same at a second station between said first and third station, a rotatable and axially movable head carrying at least one milling knife having its cutting axis disposed spaced from the axis of rotation of said head, a support member disposed spaced from said head to be engaged by the other end of each container body positioned at said second station by said indexing member to hold the same from movement relative to said head, means for rotating said head, and means for axially moving said rotating head toward said positioned container body to compact said positioned container body against said support member and cause said knife to trim the open end of said positioned container body whereby after said container body has been trimmed at said second station said indexing member will index said trimmed body away from said first station toward said third station and will index another container body received at said first station to said second station.

13. Apparatus for deburring an open end of a container body or the like comprising a container body carrying member, means for serially feeding container bodies to said member at a first station, means for serially removing said container bodies from said member at a third station, means for indexing said member to serially move each container body through an orbital path and position the same at a second station between said first and third station, a rotatable and axially movable head carrying at least one pair of cooperating rollers defining a nip therebetween and having axes of rotation disposed spaced from the axis of rotation of said head, said rollers respectively having deburring surfaces, a support member disposed spaced from said head to be engaged by the other end of each container body positioned at said second station by said indexing member to hold the same from movement relative to said head, means for rotating said head, and means for axially moving said rotating head toward said positioned container body to compact said positioned container body against said support member and cause said open end of said positioned container body to be received in said nip of said rollers and be deburred thereby whereby after said container body has been deburred at said second station said indexing member will index said deburred body away from said first station toward said third station and will index another container body received at said first station to said second station.

14. Apparatus for trimming and deburring an open end of a container body or the like comprising a container body carrying member, means for serially feeding container bodies to said member at a first station, means for serially removing said container bodies from said member at a third station, means for indexing said member to serially move each container body through an orbital path and position the same at a second station between said first and third stations, a rotatable and axially movable head carrying at least one milling knife having its cutting axis disposed spaced from the axis of rotation of said head, said head carrying at least one pair of cooperating rollers defining a nip therebetween and having axes of rotation disposed spaced from said axis of rotation of said head, said rollers respectively having deburring surfaces, a support member disposed spaced from said head to be engaged by the other end of each container body positioned at said second station by said indexing member to hold the same from movement relative to said head, means for rotating said head, and means for axially moving said rotating head towards said positioned container body to compact said positioned container body against said support member and cause said knife to trim said open end of said positioned container body and to cause said open end of said positioned container body to be received in said nip of said rollers and be deburred thereby whereby after said container body has been trimmed and deburred at said second station said indexing member will index said trimmed and deburred body away from said first station toward said third station and will index another container body received at said first station to said second station.

15. Apparatus for deburring an open end of a container body or the like comprising a container body carrying member, means for serially feeding container bodies to said member at a first station, means for serially removing said container bodies from said member at a third station, means for indexing said member to serially move each container body through an orbital path and position the same at a second station between said first and third stations, a rotatable and axially movable head carrying at least one pair of cooperating rollers defining a nip therebetween and having axes of rotation disposed spaced from the axis of rotation of said head, said head rotatably carrying a container body centering member, a support member disposed spaced from said head to be engaged by the other end of each container body positioned at said second station by said indexing member to hold the same from movement relative to said head, means for rotating said head, and means for axially moving said head toward said positioned container body to cause said centering member to be received in said open end of said positioned container body to align said container body relative to said rollers and to compact said positioned container body against said support member and cause said open end of said positioned container body to be received in said nip of said rollers to be deburred thereby whereby after said container body has been deburred at said second station said indexing member will index said deburred body away from said first station toward said third station and will index another container body received at said first station to said second station.

16. Apparatus for trimming an open end of a container body or the like comprising a container body carrying member, means for serially feeding container bodies to said member at a first station, means for serially removing said container bodies from said member at a third station, means for indexing said member to serially move each container body through an orbital path and position the same at a second station between said first and third stations, a rotatable and axially movable head carrying at least one cutting knife having its cutting axes disposed spaced from the axis of rotation of said head, said head rotatably carrying a container body centering member, a support member spaced from said head to be engaged by the other end of each container body positioned at said second station by said indexing member to hold the same from movement relative to said head, means for rotating said head, and means for axially moving said head toward said positioned container body to compact said positioned container body against said support member and cause said centering member to be received in said open end of said positioned container body to align said positioned container body relative to said knife and to cause said knife to trim said open end of said positioned container body whereby after said container body has been trimmed at said second station said indexing member will index said trimmed body away from said first station toward said third station and will index another container body received at said first station to said second station.

17. Apparatus for trimming and deburring an open end of a container body or the like comprising a container body carrying member, means for serially feeding container bodies to said member at a first station, means for serially removing said container bodies from said member at a third station, means for indexing said member to serially move each container body through an orbital path and position the same at a second station between said first and third stations, a rotatable and axially movable head carrying at least one milling knife having its cutting axis disposed spaced from the axis of rotation of said head, said head carrying at least one pair of cooperating rollers defining a nip therebetween and having axes of rotation disposed spaced from said axis of rotation of said head, said rollers respectively having deburring surfaces, said head rotatably carrying a container body centering member, a support member disposed spaced from said head to be engaged by the other end of each container body positioned at said second station by said indexing member to hold the same from movement relative to said head, means for rotating said head, and means for axially moving said head toward said positioned container body to cause said centering member to be received in said open end of said positoned container body to align said positioned container body relative to said knife and said rollers, to cause said positioned container body to be compacted against said support member, to cause said knife to trim said open end of said positioned container body and to cause said open end of said positioned container body to be received in said nip of said rollers and be deburred thereby whereby after said container body has been trimmed and deburred at said second station said indexing member will index said trimmed and deburred body away from said first station toward said third station and will index another container body received at said first station to said second station.

References Cited by the Examiner

UNITED STATES PATENTS

| | | | |
|---|---|---|---|
| 1,972,022 | 8/1934 | Le May | 90—12 |
| 2,490,371 | 12/1949 | Norton | 90—12 |
| 2,645,000 | 7/1953 | Finch | 29—57 |

RICHARD H. EANES, JR., *Primary Examiner.*